Dec. 11, 1951     H. RONICKER ET AL     2,578,318
VERTICALLY ADJUSTABLE BIFOCAL SPECTACLES
Filed Jan. 31, 1948     2 SHEETS—SHEET 1
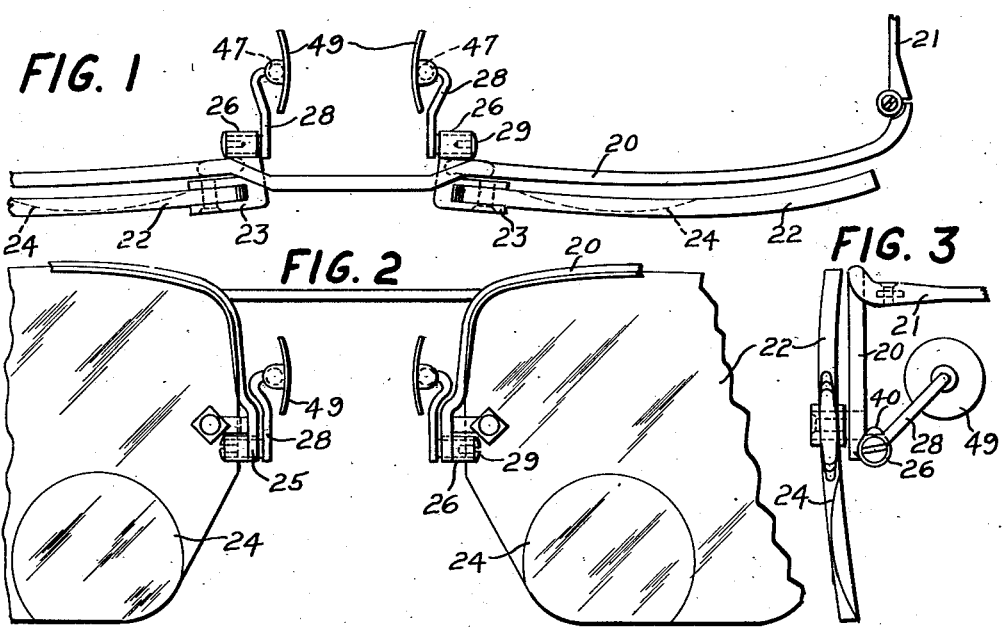
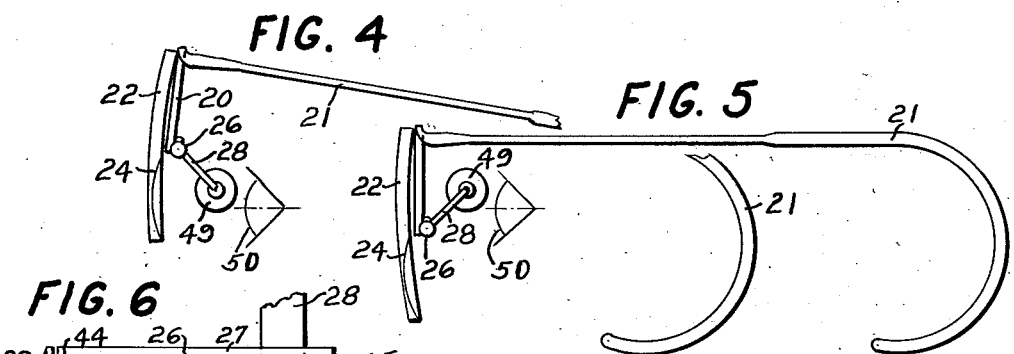
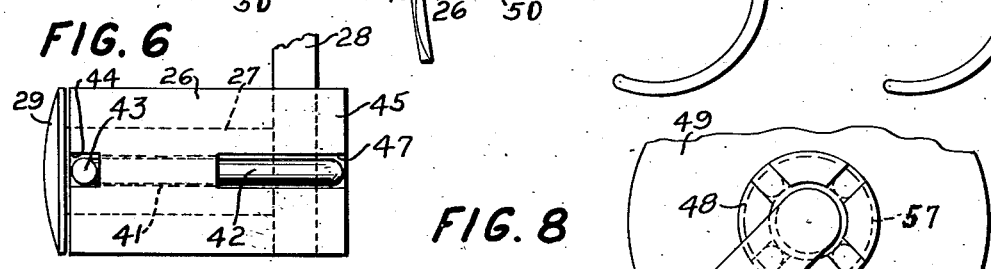
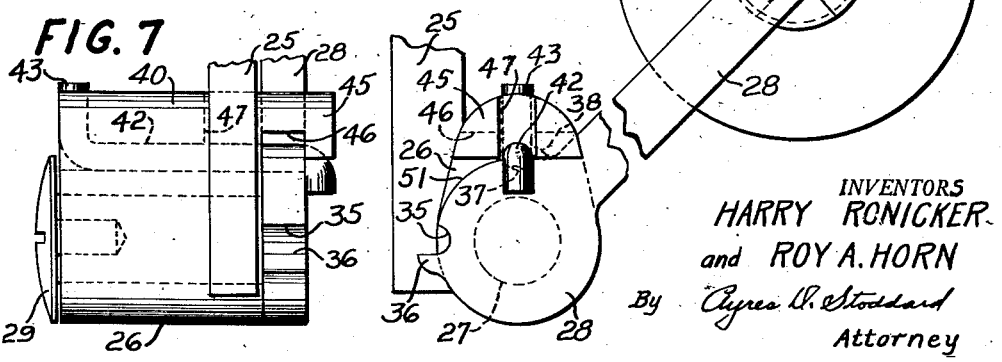
INVENTORS
HARRY RONICKER
and ROY A. HORN
By Ayres A. Stoddard
Attorney

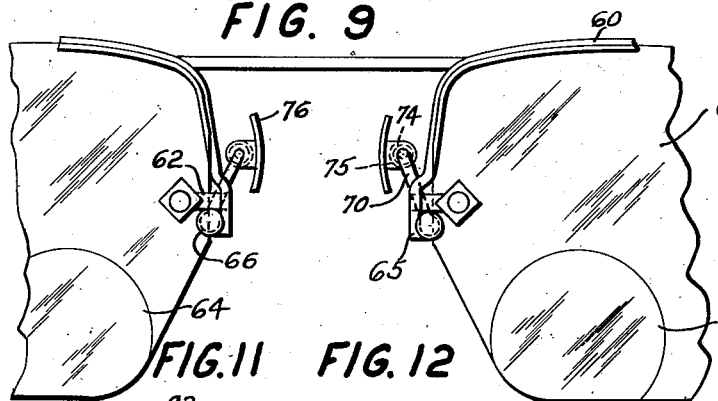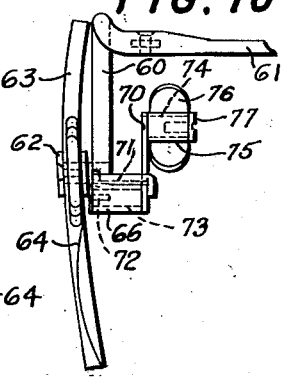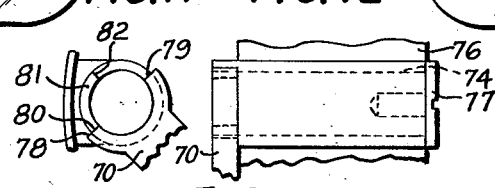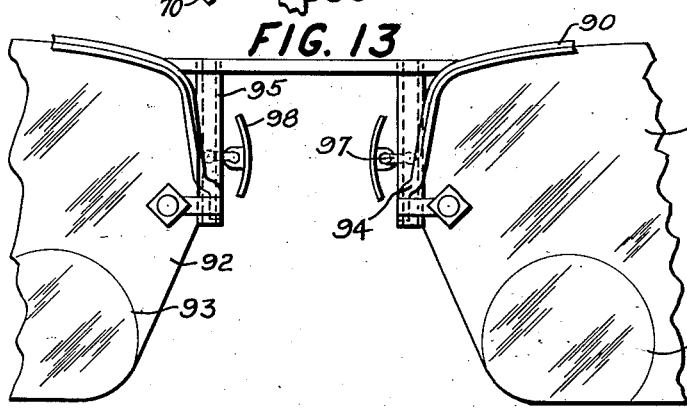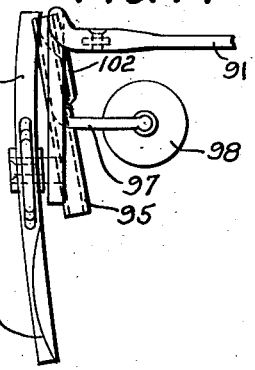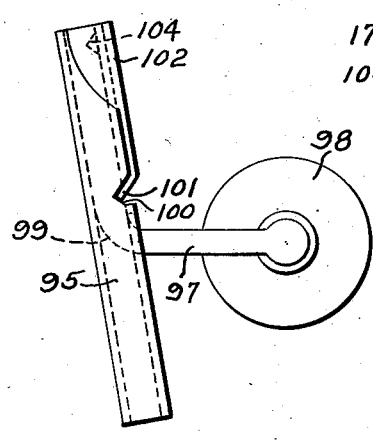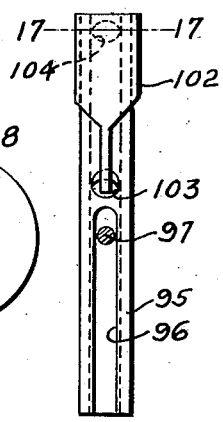

Patented Dec. 11, 1951

2,578,318

UNITED STATES PATENT OFFICE 2,578,318

VERTICALLY ADJUSTABLE BIFOCAL SPECTACLES

Harry Ronicker, West Milton, and Roy A. Horn, Dayton, Ohio

Application January 31, 1948, Serial No. 5,656

4 Claims. (Cl. 88—49)

This invention relates to spectacles and particularly to the means and manner of constructing the frame for adjustability on the wearer whereby, when the spectacles are of the bifocal type, the reading or short focal areas can be readily adjusted from the normal position, which is below the horizontal center line of vision, upwardly to bring said short focal areas approximately on the horizontal center line of vision, and whereby, when the spectacles are of the kind used by the wearer when shooting, the spectacles can be readily adjusted for gun sighting. The latter type are often called "shooting goggles."

The advantage of an adjustable frame for shooting spectacles is of course obvious because when the wearer is sighting a target, by lowering his head for such position he would be looking over the top of ordinary spectacles, but with our novel adjustable framework the frame and lenses are raised so that he can look through the lenses instead of over the top of the lenses, thus making for more accuracy when target shooting.

Such adjustable frames with single lenses, are also advantageous for others who do not need or use the bifocal or trifocal lenses, especially for distance vision when reading or when sitting at a desk.

In the vast majority of bifocal spectacles the reading or short focal areas of the lenses are located adjacent the bottom edge of said lenses, which is, of course, the normal position for such short focal areas, since it is the most convenient for normal reading positions and also for desk work.

However, when a reader, wearing bifocal lenses, is sitting with, for example, a newspaper spread out before him, or is holding the paper with full spread out for reading, it becomes very difficult for the reader to see and read the matter printed at and near the top of the paper, and it therefore, becomes necessary for him to bend his neck backwardly in order to read through the short focal areas of his bifocal spectacles. This is an extremely tiresome position for any person to read in for any length of time. The same is true when standing, for example, in front of a bulletin board and trying to read the notices at and near the top of the board.

To overcome these inconveniences and to eliminate such awkward reading positions of the readers' heads we have invented a very practical and novel mounting or framework for bifocal lenses wherein the wearer can raise the short focal areas of his bifocal lenses into a position whereby he can read the printed matter at and near the top of a newspaper when sitting, without having to bend his neck backwardly, and also whereby he can read any material at and near the top of a bulletin board when standing, without having to bend his neck backwardly, thus relieving the bifocal wearer of a great amount of strain.

It is therefore an object of our invention to provide a novel adjustable framework for spectacles.

It is another object of our invention to provide a novel framework for bifocal spectacles to permit the short focal areas of the bifocal lenses to be raised on the wearer, relative to the line of vision of the wearer.

It is a further object of our invention to provide novel bifocal spectacles having adjustable features to permit the wearer to change the line of vision through the short focal areas of his spectacles.

It is a still further object of our invention to provide bifocal spectacles with a novel adjustable nose pad mount whereby the wearer may raise the line of vision through the short focal areas to offset the backward bending of the wearer's neck when reading above the normal line of vision.

Another object of our invention is the provision of a novel pivotally adjustable nose pad mounting for spectacles.

Another object is the provision of a novel slidably adjustable nose pad mounting for bifocal spectacles.

A still further object is to provide a novel adjustable nose pad mounting for bifocal spectacles to control the position of the short focal areas of the bifocal spectacles relative to the shifting line of vision of the wearer.

With these and other incidental objects in view, our invention includes certain other novel features of construction and combinations of parts, the essential elements of which are set forth in appended claims, and a preferred and modified forms of embodiment which are hereinafter described with reference to the drawings which form part of this specification.

In said drawings:

Fig. 1 is an enlarged top edge view, partly broken away, of a pair of spectacles showing our novel adjustable means for shifting the frame to raise the short focal areas of the lenses, and for shifting the frame to raise the main lens to sighting position when the wearer bends his head forward.

Fig. 2 is a front view of the same.

Fig. 3 is an end view of the same.

Fig. 4 is an end view on a smaller scale, showing the spectacles in raised or adjusted position to bring the short focal areas in a higher line of vision, and to raise the main body of a single lens, when one is used, into a higher sighting position.

Fig. 5 shows the spectacles in the normal position.

Fig. 6 is an enlarged view, in top plan, of one of the adjustable mounts for the frame and nose pad, the latter broken away.

Fig. 7 is a front view of said nose pad mount.

Fig. 8 is an end view of the nose pad mount, the pad arm and pad partly broken away, and also shows a part of the frame.

Fig. 9 shows a modified form of an adjustable spectacle frame, nose pad mounts and nose pad.

Fig. 10 is an end view of the same.

Fig. 11 shows part of the modified form of nose pad and arm.

Fig. 12 is a side view of the same.

Fig. 13 shows another modified form of adjustable spectacle frame where the nose pad arm guide slide members are secured to the frame, to permit the spectacle to be raised.

Fig. 14 is an end view of the same.

Fig. 15 shows the nose pad, its guide arm, the spectacle frame slide and clip to hold the spectacles in adjusted position whether up or down.

Fig. 16 is a rear view of the same with the nose pad removed and the nose pad arm shown in section.

Fig. 17 is a section on line 17—17 of Fig. 16.

Detailed description

Referring particularly to Figs. 1 to 3 we have shown a pair of spectacles comprised of a frame 20 having the usual bows or temples 21 (only one one of which is shown) and a pair of lenses 22 mounted in brackets 23 secured to the frame 20. The lenses 22 each have a reading or short focal area 24 arranged in the normal position at the bottom of the lenses 22.

Secured to each of the vertical sections 25 of the frame 20 is a mount 26 into which is turnably mounted a tenon 27 of a nose pad arm 28. This tenon 27 is slightly longer than the width of the mount 26 and is tapped to receive a retaining screw 29.

The nose pad arm 28 has a recess 35 and a stop or limiting lug 36 normally in the position shown in Figs. 7 and 8. The nose pad arm 28 has another recess 37 and another stop or limiting lug 38.

The mount 26 has a rounded portion 40 having a hole 41 to receive a spring retaining pin 42 which normally rests in the recess 37 to retain the nose pad arm 28 in normal position. An upright end 43 of the pin 42 projects into a vertical slot 44 of the portion 40 of the mount 26 and prevents turning of the retaining pin 42. The portion 40 of the mount 26 has one end 45 extending over and beyond the nose pad arm 28 as shown in Figs. 6, 7 and 8. A clearance slot 46 is provided for the nose pad arm 28 and its two stop lugs 36 and 38. A slot 47 through the top of the end 45, and extending into the main part of the portion 40, provides a space for the spring retaining pin 42 to flex during the operation of adjusting the spectacles, as will be hereinafter described.

The upper end of the nose pad arm 28 has a ball 57 arranged to turn in a socket 48 secured to a nose pad 49.

Our novel adjustable bifocal spectacles are operated for adjustment from the normal position, shown in Fig. 5, to the adjusted position, shown in Fig. 4 in the following manner.

In Figs. 4 and 5 we have shown a wearer's eye diagramatically and designated it 50. When the wearer is reading normally through the short focal areas 24 the relation between the eye 50 and this short focal area 24 is substantially as shown in Fig. 5 wherein the line of vision through the short focal area is way below the horizontal center line of vision. To permit the wearer to read much higher on a page of reading matter, without bending the head backwards, the wearer merely pushes upwardly on the bottoms of the lenses 22 until the spectacles reach the position shown in Fig. 4, wherein the short focal areas are slightly above the horizontal line of vision.

During this upward movement of the spectacles the nose pad arms 28 pivot around the center of the ball 57 and around the center of the tenon 27. During such movement the right end (Fig. 7) of the retaining pin 42 is cammed out of the recess 37 (Fig. 8), the pin being of spring material permits such flexing thereof, and rides on a concentric surface 51 of the nose pad arm 28 until the recess 35 comes opposite said flexed pin 42, whereupon the arm 28 is stopped from further turning by contact of the stop lug 36 with the pin 42 and the latter now springs back into its normal resting position in the recess 35, thus retaining the spectacles in their upper or adjusted position shown in Fig. 4.

To lower the spectacles to normal position the wearer presses slightly on the top of the frame 20 or the lens 22, with just sufficient pressure to cam the pin 42 out of the recess 35 and then the weight of the spectacles will turn the nose pad arm 28 until the pin 42 again rests in the recess 37. This is the normal position and the arm 28 cannot turn any farther because of the stop lug 38.

Modified form

Referring now to Figs. 9 and 12 we will describe one of our modifications of our invention.

Here shown is a pair of spectacles comprised of a frame 60 having the usual temples 61 (only one of which is shown). Brackets 62 carry lenses 63 each having a short focal area 64. Secured to each vertical section 65 of the frame 60 is a mount 66 like the mount 26. However, this mount 66 is secured to the vertical section 65 at right angles or 90° different than the mount 26, as is clear from Figs. 9 and 10. This mount 66 turnably supports a nose pad arm 70, the lower end of which is identical with the lower end of the nose pad arm 28 (Fig. 8). A retaining spring pin 71 functions like the pin 42, and a retaining screw 72 holds a tenon 73 of the arm 70 in the mount 66.

The upper end of the nose pad arm 70 has a tenon 74 turnably mounted in a sleeve 75 secured to a nose pad 76. A retaining screw 77 holds the tenon in the sleeve 75. The arm 70 is cut away to form two stop surfaces 78 and 79. The surface 78 normally contacts an edge 80 of a flange 81 of the sleeve 75 when the short focal area 64 is down. When the spectacles are raised to bring the short focal area 64 up to the position, such as shown in Fig. 4, the arm 70 turns in the mount 66 and the tenon 74 turns in the sleeve 75 until the surface 79 stops against the edge 82 of the flange 81. The spring pin 71 (Fig. 10) functions like the pin 42, previously described, to retain the spectacles in their upper or adjusted position.

Second modification

In Figs. 13 to 17 we have shown a second modification of our invention. Here a spectacle frame 90 with the usual temples 91 carries a pair of lenses 92 having short focal areas 93. Secured to each vertical section 94 of the frame 90 is a sleeve 95 having a slot 96 into which projects a nose pad arm 97 fastened to a nose pad 98. This arm 97 has an upright member 99 having a recess 100 into which projects the end 101 of a spring clip 102 secured to the sleeve 95. A hole 103 in the sleeve 95 permits engagement of the clip 101 with the recess 100.

To raise the spectacles so that the short focal areas 93 are in the upper position relative to the eyes of the wearer, as shown in Fig. 4, the wearer merely pushes upwardly on the bottoms of the lenses 92 whereupon the sleeves 95 slide upwardly on the members 99 of the nose pad arms 97 until the end 101 of the clip 102 engages a recess 104 near the upper ends of the members 99 when the holes 103 of the sleeves 95 arrive opposite said recesses 104. The ends 101 of the clips 102 now retain the spectacles of Figs. 13 and 14 in their upper adjusted positions whereby the wearer can read without bending his neck.

It is not our intention to limit our invention to the specific forms shown for it is susceptible in other forms all coming within the scope of the claims which follow.

What we claim is:

1. A pair of bifocal spectacles including a frame, a pair of temples, a pair of nose pads and a pair of bifocal lenses with the reading areas at the bottom of the lenses and below the horizontal line of vision when on the wearer, in combination with a plurality of means rigidly secured to said frame, each means having a plurality of recesses connected by a hole; members each having a plurality of recesses, one member being pivotally mounted in each of said means and in each of said nose pads to adjust said spectacles to move said reading areas from below the horizontal line of vision of the wearer up to the horizontal line of vision of the wearer; and means arranged in each of said holes and extending into the associated recesses of each of said first mentioned means and cooperating with the recesses in said members to retain said reading areas of the lenses in the position below the horizontal line of vision or in the horizontal line of vision depending upon the position into which said reading areas have been adjusted.

2. A pair of bifocal spectacles including a frame, a pair of temples, a pair of nose pads and a pair of bifocal lenses with the reading areas at the bottom of the lenses and below the horizontal line of vision when on the wearer, in combination with a plurality of means rigidly secured to said frame, each means having a plurality of recesses connected by a hole; a member having a plurality of recesses and being pivotally mounted in each of said means and in each of said nose pads to adjust said spectacles to move said reading areas from below the horizontal line of vision of the wearer up to the horizontal line of vision of the wearer; means arranged in each of said holes and extending into the associated recesses of each of said first mentioned means and cooperating with the recesses in said members to retain said reading areas of the lenses in any line of vision into which they have been adjusted, and limiting means on each of said members adapted to cooperate with said retaining means to prevent adjustment of said reading areas beyond said two mentioned lines of vision.

3. A pair of bifocal spectacles including a frame, a pair of temples, a pair of nose pads and a pair of bifocal lenses with the reading areas at the bottom of the lenses and below the horizontal line of vision when on the wearer, in combination with a plurality of means rigidly secured to said frame, each having a vertical recess and a horizontal recess connected by an opening; members having a plurality of recesses and being pivotally mounted in said means and in said nose pads to adjust said spectacles to move said reading areas from below the horizontal line of vision of the wearer up to the horizontal line of vision of the wearer; retaining means arranged in said openings and projecting into said vertical and said horizontal recesses and also projecting into one of the recesses of each of said members to retain said reading areas normally below the line of vision of the wearer and adapted to cooperate with the other recesses in said members when said reading areas are adjusted into said horizontal line of vision to retain said reading areas in said adjusted horizontal line of vision.

4. A pair of bifocal spectacles including a frame, a pair of temples, a pair of nose pads and a pair of bifocal lenses with the reading areas at the bottom of the lenses and below the horizontal line of vision when on the wearer, in combination with a plurality of means rigidly secured to said frame, each having a vertical recess and a horizontal recess connected by an opening; members having a plurality of recesses and being pivotally mounted in said means and in said nose pads to adjust said spectacles to move said reading areas from below the horizontal line of vision of the wearer up to the horizontal line of vision of the wearer; retaining means arranged in said openings and projecting into said vertical and said horizontal recesses and also projecting into one of the recesses of each of said members to retain said reading areas normally below the line of vision of the wearer and adapted to cooperate with the other recesses in said members when said reading areas are adjusted into said horizontal line of vision to retain said reading areas in said adjusted horizontal line of vision, and stop lugs on said members adjacent said recesses in said members to prevent adjusting said reading areas of the lenses beyond said two mentioned lines of vision.

HARRY RONICKER.
ROY A. HORN.

REFERENCES CITED

The following references are of record in the file of this patent:

UNITED STATES PATENTS

| Number | Name | Date |
|---|---|---|
| 565,796 | Riglander | Aug. 11, 1896 |
| 1,102,909 | Hanna | July 7, 1914 |
| 2,112,163 | Kimmel | Mar. 22, 1938 |
| 2,141,287 | Bouchard | Dec. 27, 1938 |
| 2,197,020 | Page | Apr. 16, 1940 |
| 2,305,716 | Kimmel | Dec. 22, 1942 |
| 2,321,083 | Higgins | June 8, 1943 |
| 2,350,386 | Christman | June 6, 1944 |
| 2,371,745 | Ellestad et al. | Mar. 20, 1945 |